United States Patent [19]

Kudoh

[11] 4,196,873
[45] Apr. 8, 1980

[54] TWO TAPE-CARTRIDGE TYPE MAGNETIC-TAPE RECORDING/REPRODUCING APPARATUS

[75] Inventor: Kohmin Kudoh, Tokyo, Japan

[73] Assignee: Nippon Electric Co., Ltd., Tokyo, Japan

[21] Appl. No.: 971,100

[22] Filed: Dec. 19, 1978

[30] Foreign Application Priority Data

Dec. 20, 1977 [JP] Japan ................. 52-153917

[51] Int. Cl.² ............... G11B 15/66; G11B 23/10
[52] U.S. Cl. ................... 242/195; 242/192; 242/197; 352/157
[58] Field of Search ........... 242/195, 197, 192, 71.1; 352/157, 158; 360/96, 132, 93

[56] References Cited

U.S. PATENT DOCUMENTS

| 3,318,548 | 5/1967 | Palmer | 242/192 |
| 3,516,738 | 6/1970 | Wells | 352/158 |
| 3,526,371 | 9/1970 | Blackie et al. | 242/192 |
| 3,586,430 | 6/1971 | Rempala | 352/158 |
| 3,704,836 | 12/1972 | Yamada | 242/192 |

FOREIGN PATENT DOCUMENTS 424358  1/1926  Fed. Rep. of Germany ......... 242/71.1

Primary Examiner—George F. Mautz
Attorney, Agent, or Firm—Hopgood, Calimafde, Kalil, Blaustein & Lieberman

[57] ABSTRACT

A two tape-cartridge-type magnetic recording/reproducing unit is provided which includes tape-guide members for directing leader tape from a supply cartridge into the tape path, and an arm having a roller thereon for pressing the leader tape entering a take-up cartridge against the reel hub therein, to enable the tape to be securely wound on the reel hub of the tape-up cartridge. For tape replacement after a tape length has been utilized, there is no need to rewind the used tape on the reel of the supply cartridge.

3 Claims, 3 Drawing Figures

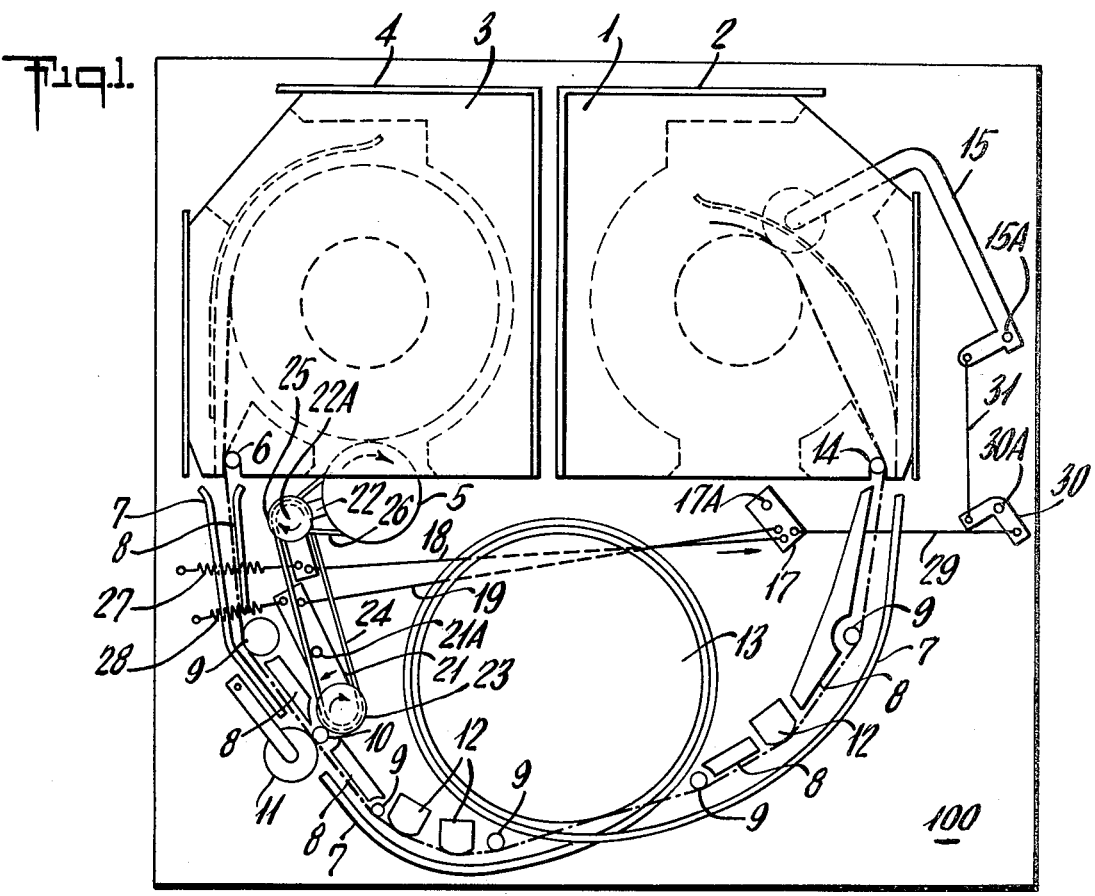
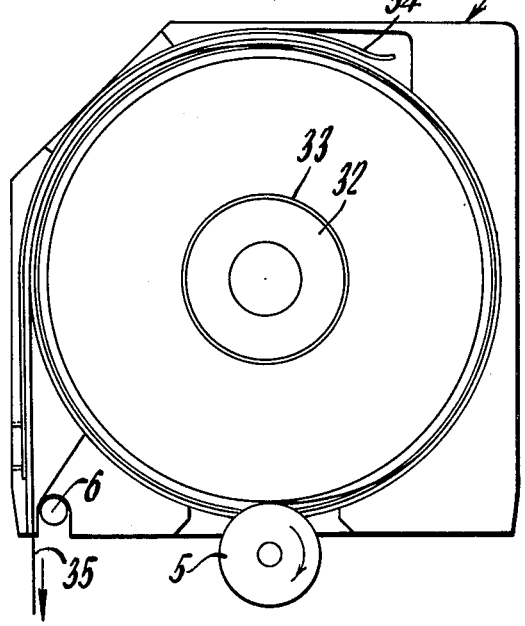
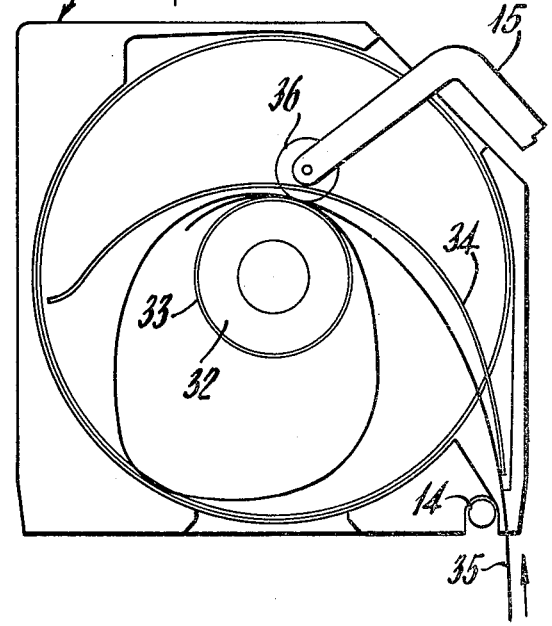

TWO TAPE-CARTRIDGE TYPE MAGNETIC-TAPE RECORDING/REPRODUCING APPARATUS

This invention relates to magnetic-tape recording/reproducing apparatus and, more particularly, to such apparatus of the tape-cartridge variety.

Conventional tape-loading with such magnetic-tape recording/reproducing apparatus is typically achieved by threading a relatively stiff leader tape through the tape-transport deck, with the leader end wrapped around the hub of a cartridge take-up reel, for winding. However, to remove used tape wound according to this technique, it has been necessary to rewind the entire length of the tape every time a recording/reproducing operation is completed for a given cartridge.

It is an object of this invention to provide a novel cartridge-type magnetic-tape recording/reproducing apparatus which requires no tape-rewinding operations for cartridge removal and/or replacement.

According to the present invention, magnetic-tape recording/reproducing apparatus is provided with means for operatively holding two tape cartridges therein; these cartridges may be identical and each is adapted to accommodate a magnetic tape with leader tapes bonded to the respective ends thereof. The apparatus serves the tape-delivering function to thread a leader tape from one cartridge (the supply cartridge) across the tape transport deck of the apparatus, and also serves the function of winding the threaded leader tape on the other cartridge (the take-up cartridge).

The above and other objects, features and advantages of the present invention will become apparent from the following description of a preferred embodiment, reference being had to the accompanying drawings.

In the drawings:

FIG. 1 is a schematic plan view of a preferred form of two-cartridge-type magnetic-tape recording/reproducing apparatus of the present invention;

FIG. 2 is an enlarged plan view of one of the cartridges, in use as the supply cartridge, showing the manner in which it thus operates; and FIG. 3 is a view similar to FIG. 2 to illustrate the other cartridge, in use as the take-up cartridge, showing the manner in which it thus operates.

The tape recording/reproducing apparatus of the invention will be described in connection with tape-loading and threading operations, in connection with FIG. 1. First, an empty cartridge 1 with no magnetic tape accommodated therein is mounted to a cartridge holder 2 on the take-up side of a tape-transport deck 100, and then another cartridge 3 having a magnetic tape accommodated therein is mounted to a cartridge holder 4 on the supply side of the tape deck. A leader-tape delivering roller 5 is placed in driving contact with the leader tape bonded to the leading end of the magnetic tape and functions to deliver the leader tape therefrom. The leader tape so delivered proceeds over a guide pin 6 and along a tape path defined by a leader-tape guide rail 7 and an inside leader-tape restrainer plate 8.

Arranged along the tape path are plural tape-guide posts 9, a capstan 10, a pinch roller 11, stationary heads 12 for audio signals, and a head drum 13. The leader tape proceeding along the tape path is directed around the head drum 13 to make a complete turn thereon and is finally passed over a guide pin 14 to enter the take-up cartridge 1. On the take-up side of the tape transport deck 100, a roller arm 15 pivotally mounted at 15A enables accurate and efficient tape-winding operation in the cartridge 1 (see FIG. 3).

The leader-tape delivering roller 5 is carried on one arm of a bell crank 22, which is pivotally mounted at 22A to the deck 100. A pulley 25 is also mounted on the same pivot 22A, and a belt 24 connects pulley 25 to another pinch roller 23, carried by one arm of a rocker-arm member 21, pivotally mounted at 21A. Pulley 25 is also linked by a belt 26 to roller 5, so that driving force picked up by the pinch roller 23 at capstan 10 may be transmitted to roller 5 via belt 24, pulley 25, and belt 26. Normally, the respective other arms of members 21 and 22 are biased leftward by spring means 28 and 27, respectively, so that pinch roller 23 may be out of contact with capstan 10 and so that the rollers may be disengaged from tape in the cartridge 3.

The spring-biased other ends of members 21 and 22 are also linked by tension wires 18 and 19 with a crank arm 17, pivotally mounted at 17A on the take-up side of deck 100; crank arm 17 is also linked to the roller arm 15 via a rigid link 29, a bellcrank 30 pivotally mounted at 30A, and another rigid link 31, to keep the roller at the outer end of roller arm 15 engaged with the tape in the take-up cartridge 1. It is to be noted that the wires 18 and 19 are maintained in tension to provide a smooth transmission of driving force for tape-threading and loading operations, to be described.

Referring further to FIG. 1, upon actuation of a switch (not shown) to initiate a threading operation, a solenoid (not shown) drives crank 17 counterclockwise to the extent of a predetermined angle, pulling wires 18 and 19 to the right. This causes members 21 and 22 to shift, bringing rollers 23 and 5 into engagement with the capstan 10 and with the tape in the supply cartridge 3, respectively; roller 5 is thus driven to expel leader tape from the cartridge 3. At the same time, the counterclockwise motion of crank 17 causes bellcrank 30 to move further counterclockwise, to bring the roller on arm 15 into firmer engagement with the hub of the take-up reel of cartridge 1.

It will be understood that subsequent release of the solenoid may be automatically effected in response to a magnetic-tape detector, an optical sensor, or the like provided on the tape path on the take-up side. On release of the solenoid, members 15, 21 and 22 are returned to their normal positions, through the biasing action of spring means 27 and 28.

In FIGS. 2 and 3, the supply cartridge 3 and the take-up cartridge 1 are each seen to include a tape-reel hub 32, which has an elastomeric peripheral surface 33 to enable leader tape to be securely wound thereon with ease and efficiency. Each of the cartridges also includes a leaf spring 34 which serves to guide leader tape 35 entering the cartridge inwardly toward the reel hub 32 for efficient tape-winding thereon, as will be described further in connection with the take-up cartridge 1; in FIG. 2, leaf spring 34 is shown in a position it assumes when supplying tape from cartridge 3.

The tape-supply system of the cartridge is substantially the same as that described in detail in Japanese Utility Model Application No. 81231/77 and in Japanese patent Application No. 16432/77, and it will suffice for the purposes of the present invention to set forth only a rather general description of the system. Referring to FIGS. 1 and 2, the cartridge 3 is seen to be formed with its corner apertured for tape passage and with a U-shaped recess for fitting engagement with the adjacent guide pin 6. Within the cartridge, two tape-guiding walls converge toward the corner aperture; one of these walls is defined by the inner surface of the leaf spring 34, and the other wall is a fixed part of the cartridge housing, extending at a straight sloping incline with respect to the nearby vertical side of the cartridge, the sloping inclination being tangential to the periphery 33 of the reel hub 32. With this arrangement, moving tape will encounter no contacting engagement within the cartridge, irrespective of the amount of tape remaining on the reel.

Reference will next be had to FIG. 3, which illustrates operation of cartridge 1 on the take-up side of the deck. As seen in this figure, leader tape 35 enters cartridge 1 past the guide pin 14, having been under the guidance of the leader-tape guide rail 7 and the inside leader-tape restrainer plate 8 (FIG. 1); within cartridge 1, the leader tape is directed along and by leaf spring 34, toward the reel hub 32. And it will be recalled that, for this threading condition, controlled actuation of arm 17 (FIG. 1) has driven roller arm 15 to press leader tape 35 against the reel hub 32, it being understood that leaf spring 34 is locally apertured to allow passage therethrough of the pressure roll 36 which is carried on the free end portion of roller arm 15. As will readily be recognized, with the arrangement just described, tape entering cartridge 1 can be securely and efficiently wound on the reel hub 32.

It will be appreciated from the foregoing description that, in use of two tape-cartridge type magnetic-tape recording and/or reproducing apparatus of the present invention, tape replacement can be efficiently performed simply by winding the tape on either the take-up side or supply side of the tape transport deck, and by then replacing the cartridge into which the tape has been thus wound. For instance, after a recording or reproducing operation, the take-up side cartridge can readily be removed and the supply side cartridge, now emptied of tape, can be transferred to the take-up side of the tape deck. Subsequently, another cartridge with a tape accommodated therein is mounted on the supply side of the take deck so that another recording or reproducing operation may be started at once, enabling more efficient use of the apparatus.

Alternatively, the empty cartridge on the supply side of the tape deck may be left intact and the cartridge on the take-up side thereof be replaced by another cartridge with a tape accommodated therein. However, in this alternative case, tape movement in ensuing operation must be effected in the reverse direction, that is, from the right to the left side of the tape deck, and it will be understood that for such a reversed operation a second pressure arm and roller 15-36 will have been provided on the left side of the deck to assure effective engagement of reverse-threaded leader tape into the cartridge 3, which in such case will be the take-up cartridge.

For the replay of the tape completely wound on the take-up side cartridge, after a successive recording or reproducing operation, the cartridge, into which the tape has been wound, is placed on the supply side of the deck with an empty cartridge placed on the take-up side, to allow the tape to be wound into the empty cartridge through the automatic threading as described above. When the tape is completely wound up, the filled-up cartridge is transferred to the take-up side for replay.

It will be apparent to those skilled in the art that the invention is not restricted to the features described above and shown in the drawings, but may be varied in many ways without departing from the claimed scope of the invention.

What is claimed is:

1. A two-cartridge type magnetic-tape recording/reproducing apparatus, comprising a pair of cartridge holders provided on the supply and take-up sides of the apparatus to accommodate separate tape cartridges, tape-guide means for guiding leader tape from the supply-side tape cartridge into the path of tape travel, and means for pressing leader tape entering the take-up side cartridge against the reel hub provided therein to enable leader tape to be securely wound in the take-up side tape cartridge, said last-defined means including a pressure arm pivotally mounted external to the take-up cartridge holder, a take-up cartridge including a reel hub and having a side opening to insertably receive the free end of said arm, said take-up cartridge being removably received in said take-up cartridge holder, and selectively operable means for displacing the free end of said arm into squeezed leader-tape engagement with the take-up reel hub; said take-up cartridge including a leaf spring mounted to the tape cartridge near the point of leader-tape entry and arched inwardly into flexed tangency with the reel hub in readiness to receive entering leader tape, a tape-contacting pressure roller mounted to the free end of said arm, said spring having a locally slotted region of width exceeding the width of the pressure roller, and said pressure roller extending at least in part through the locally slotted region of said spring.

2. Apparatus according to claim 1, in which said tape-guide means includes leader-tape-threading means and tape-feeding means, said threading means being operative for an initial period of time and said tape-feeding means being thereafter operative, and means coordinating operative leader-tape pressing by said pressing means substantially only for the period of operation of said threading means.

3. Apparatus according to claim 1, wherein the take-up and supply cartridges are mechanical duplicates of each other, and further comprising a capstan for transporting magnetic tape along said path, said tape-guide means further comprising roller means insertably receivable in the supply cartridge for delivering the leader tape from the supply cartridge and means for transferring rotation of said capstan to said delivering-roller means, whereby the supply and take-up cartridges may be interchangeably used for their respective functions.

* * * * *